(12) United States Patent
Sasho et al.

(10) Patent No.: US 8,983,246 B2
(45) Date of Patent: Mar. 17, 2015

(54) ROTARY OPTICAL LINK JOINT

(75) Inventors: Seiji Sasho, Tokyo (JP); Makoto Kawashima, Kasugai (JP)

(73) Assignees: Asahi Kasei E-Materials Corporation, Tokyo (JP); Chubu University Educational Foundation, Kasugai-Shi (JP)

( * ) Notice: Subject to any disclaimer, the term of this patent is extended or adjusted under 35 U.S.C. 154(b) by 192 days.

(21) Appl. No.: 13/393,042

(22) PCT Filed: Aug. 27, 2010

(86) PCT No.: PCT/JP2010/064610
§ 371 (c)(1),
(2), (4) Date: May 4, 2012

(87) PCT Pub. No.: WO2011/024954
PCT Pub. Date: Mar. 3, 2011

(65) Prior Publication Data
US 2012/0213473 A1  Aug. 23, 2012

(30) Foreign Application Priority Data
Aug. 31, 2009  (JP) .................................. 2009-200713

(51) Int. Cl.
*G02B 6/26* (2006.01)
*G02B 6/42* (2006.01)
*G02B 6/36* (2006.01)

(52) U.S. Cl.
CPC .................................... *G02B 6/3604* (2013.01)
USPC .......................................................... 385/26

(58) Field of Classification Search
CPC .......... G02B 6/3604; G02B 6/26; G02B 6/38; G02B 6/40; G02B 6/04; G02B 6/42; G02B 6/24; G02B 6/36

USPC ........................................................... 385/26
See application file for complete search history.

(56) References Cited

U.S. PATENT DOCUMENTS 4,898,447 A  2/1990 Kuhlmann
5,471,553 A  11/1995 Teshima
(Continued)

FOREIGN PATENT DOCUMENTS

EP  1134600 A1  9/2001
GB  2247089 A  2/1992
(Continued)

OTHER PUBLICATIONS

International Preliminary Report on Patentability and Written Opinion of the International Search Authority, dated Mar. 13, 2012, for International Application No. PCT/JP2010/064610.
(Continued)

*Primary Examiner* — Mike Stahl
*Assistant Examiner* — Kajli Prince
(74) *Attorney, Agent, or Firm* — Birch, Stewart, Kolasch & Birch, LLP

(57) ABSTRACT

A rotary optical link joint having a small change in transmission loss during rotational use is provided. In order to realize this, the rotary optical link joint according to the present invention is an optical link joint that relatively rotatably holds, centering around an axis line (19, 29), a first optical fiber (11) and a second optical fiber (21), wherein a part or all of the first optical fiber (11) and the second optical fiber (21) are configured by a multi-core optical fiber having a plurality of cores, and wherein the plurality of cores is arranged in a circular or annular area that is sectioned by a concentric circle centered around the axis line (19, 29) of the multi-core optical fiber.

11 Claims, 10 Drawing Sheets

(56) References Cited

U.S. PATENT DOCUMENTS

| | | |
|---|---|---|
| 6,188,824 B1 | 2/2001 | Teshima |
| 2003/0087610 A1 | 5/2003 | Ono |
| 2009/0310911 A1* | 12/2009 | Zhang et al. .................... 385/26 |
| 2010/0135622 A1 | 6/2010 | Sasho et al. |

FOREIGN PATENT DOCUMENTS

| | | |
|---|---|---|
| JP | 48-54952 A | 8/1973 |
| JP | 58-21108 U | 2/1983 |
| JP | 59-69703 A | 4/1984 |
| JP | 61-162814 U | 10/1986 |
| JP | 63-108310 A | 5/1988 |
| JP | 3-122407 U | 12/1991 |
| JP | 6-186445 A | 7/1994 |
| JP | 10-136752 A | 5/1998 |
| JP | 10-170838 A | 6/1998 |
| JP | 2000-89043 A | 3/2000 |
| JP | 2001-264570 A | 9/2001 |
| JP | 2003-143272 A | 5/2003 |
| JP | 2004-240122 A | 8/2004 |
| JP | 2006-243503 A | 9/2006 |
| JP | 2008-124236 A | 5/2008 |
| JP | 2009-505153 A | 2/2009 |
| WO | 98/35247 A1 | 8/1998 |
| WO | 2007/021315 A1 | 2/2007 |
| WO | WO 2009/037742 A1 | 3/2009 |

OTHER PUBLICATIONS

Korean Office Action for Korean Application No. 10-2012-7005303 dated Apr. 24, 2013.

Chinese Office Action dated Nov. 4, 2013 for Chinese Application No. 201080038720.7.

* cited by examiner

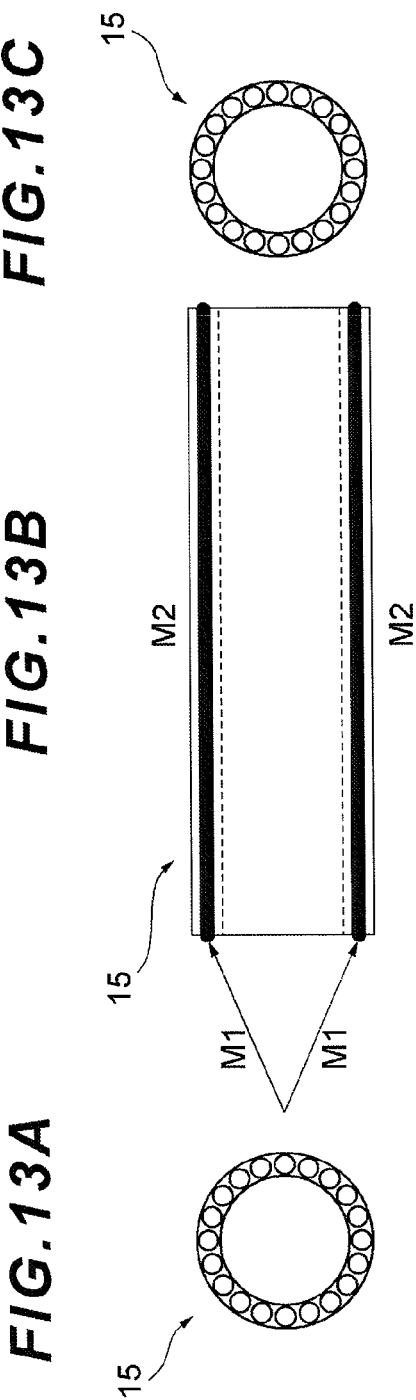

FIG. 15
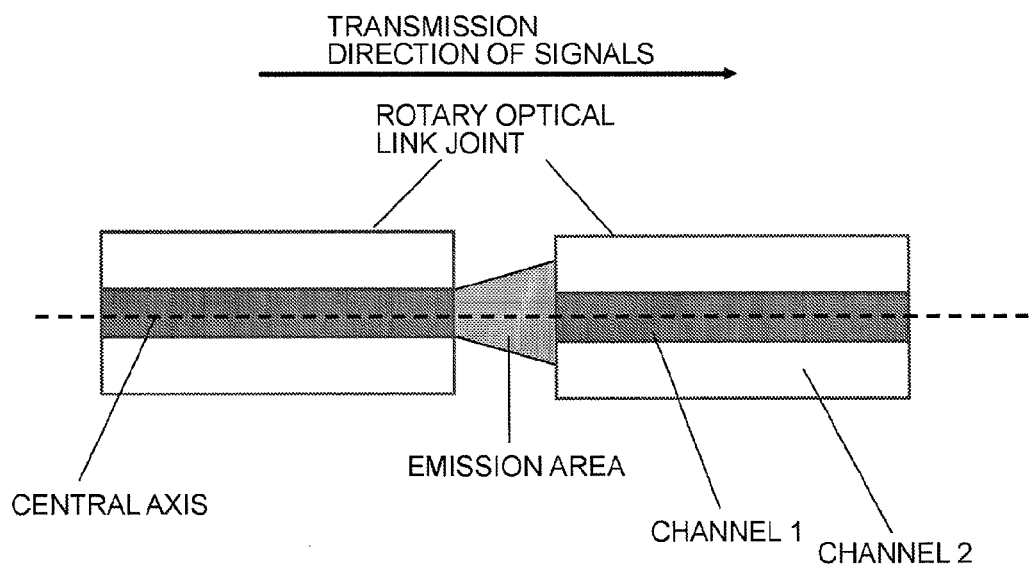
FIG. 16
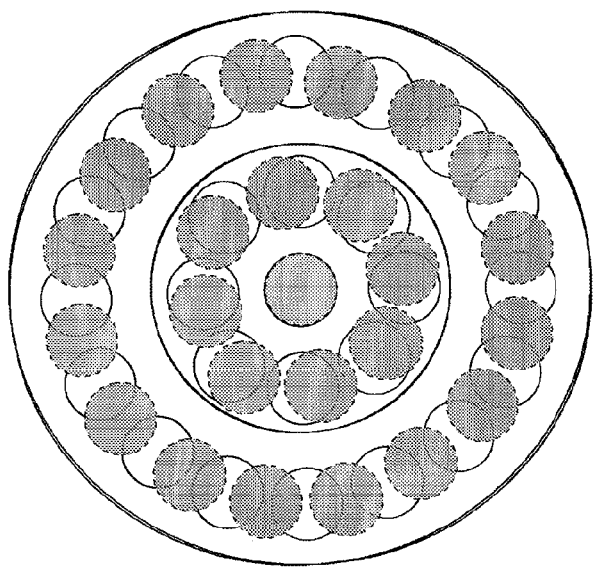
 ···EMISSION AREA
 ···CORE

ROTARY OPTICAL LINK JOINT

TECHNICAL FIELD

The present invention relates to a rotary optical link joint.

BACKGROUND ART

In recent years, monitor cameras with rotationally movable mechanisms have been widely used for the purposes of security or monitoring of production lines.

In the case of surveillance monitors, for example, high definition surveillance monitors such as Hi-Vision (HV) cameras are often used as surveillance monitors. In such monitor cameras, a two-way digital transmission function would be essential for capture-tracking control information of a subject to be photographed, photographing information of a camera, etc.

Furthermore, policies for obliging safety when driving a car by transferring the change in air pressure and temperature of a car tire to the main body of the car have been implemented in the United States and other countries. In such a case, a two-way transmission function is needed. In addition, the realization of means for rapidly transmitting information obtained at the head part to the body part of a robot and a high-speed digital link between objects that rotate with respect to each other is requested.

As described above, in recent years, the need for a digital link between rotating objects has been rapidly increasing.

However, since a line transmission method such as an electric wire may cause a cut or a remarkable reduction in reliability when it is applied to a rotationally movable mechanism, there is a need for the development of rotationally movable mechanisms to which a radio transmission method is applied.

An example of a rotationally movable mechanism of a radio transmission method may include a rotary optical link joint disclosed in, for example, patent document 1. The rotary optical link joint disclosed in patent document 1 is characterized in that a bundle fiber that is bundled from a plurality of single-core optical fibers is relatively rotatably maintained centered around an axis line.

PRIOR ART REFERENCES

Patent Documents

Patent Document 1: Japanese laid-open patent publication No. S63-108310

SUMMARY OF THE INVENTION

Problem to be Solved by the Invention

However, the rotary optical link joint of the structure disclosed in patent document 1 has a problem in that the transmission loss may largely change when it is rotationally used for a long period. Furthermore, the smaller the entire diameter of the rotary optical link joint, the more remarkable the change in the transmission loss. The reasons therefor will be explained below.

When a plurality of channels is provided in a rotary optical link joint, a problem of interference, in which optical signals that pass through respective channels interfere with each other, may occur. This interference is caused by the optical signal emitted from the core of the optical fiber in the joint part being emitted to the inverted cone-shaped area (hereinafter referred to as the emission area) in which the core of the end surface of the joint part is the apex, and the interference occurs due to the optical signal not being incident on the core constituting the desired channel but instead being incident on the core constituting another channel (see FIG. 15).

Regarding this point, in the case of a rotary optical link joint with a large entire diameter, the problem of interference is less likely to occur since the space between adjacent channels is wide. In the case of a rotary optical link joint with a small entire diameter, it is easy for the problem of interference to occur since the space between adjacent channels is narrow. Accordingly, in the case of a rotary optical link joint with a small entire diameter, there is a need to reduce the size of the emission area by bringing the opposing first joint part and the second joint part as close to each other as possible in order to reduce the influence caused by interference.

However, when the space between the first joint part and the second joint part is made closer, if the positions of the cores in the first joint part and the positions of the cores in the second joint part are changed, the transmission loss caused between the joints would also largely change due to the following reasons.

Namely, when the space between the first joint part and the second joint part is made closer, since the emission area becomes smaller, all or a part of the cores may be outside the emission area when the positions of the cores of the corresponding incident side are changed, thereby the delivery of the optical signal may not be completed. As a result, the transmission loss that occurs between the joints may be increased (see FIGS. 16 and 17).

In the case of the rotary optical link joint disclosed in cited reference 1, since there is a gap between each of the fibers, the positions of the cores are easily changed due to there being a long period of rotational use, and thus, the transmission loss that occurs between the joints may change. Particularly, in the case of a rotary optical link joint having a small joint space, the change in transmission loss would be remarkable since the emission area would be narrower.

If the transmission loss changes over time, the intensity of the reception signal may be changed even if the same signal is transmitted, and thus, in the case of, for example, a monitoring camera, this would be a cause of misinformation or malfunction.

The present invention is for solving the above new problem, which has not previously been focused on, i.e., the object of the present invention is to provide a rotary optical link joint in which the change in transmission loss during rotational use is small.

Means for Solving the Problem

As a result of intense study in order to solve the above problem, the present inventors have found that the above problem can be solved by the invention described below. The present invention is as described below.

Namely, the present invention is a rotary optical link joint that relatively rotatably holds, centering around an axis line, a first optical fiber and a second optical fiber, wherein a part or all of the first optical fiber and the second optical fiber are configured by a multi-core optical fiber having a plurality of cores, and wherein the plurality of cores is arranged in a circular or annular area that is sectioned by a concentric circle centered around the axis line of the multi-core optical fiber.

In a rotary optical link joint, it is preferable that at least one of the first optical fiber and the second optical fiber comprises a hollow multi-core optical fiber and an optical fiber inserted into a hollow part of the hollow multi-core optical fiber.

It is preferable that the optical fiber inserted into the hollow part of the hollow multi-core optical fiber is a multi-core optical fiber.

It is preferable that the multi-core optical fiber is a multi-core plastic optical fiber.

It is preferable that a connection part of the first optical fiber and the second optical fiber is covered with a tubular dustproof structure.

It is preferable that at least one of the first optical fiber and the second optical fiber is covered with a tubular structure having a conductive structure.

It is preferable that in a rotary optical link joint, a first sending optical communication path connected with a first optical fiber light-emitting element and a first receiving optical communication path connected with a first optical fiber light-receiving element in a state where light is blocked between the first sending optical communication path are provided in the first optical fiber, a second receiving optical communication path connected with a second optical fiber light-receiving element and a second sending optical communication path connected with a second optical fiber light-emitting element in a state where light is blocked between the second receiving optical communication path are provided in the second optical fiber, the first receiving optical communication path is arranged in a central part of the first optical fiber, the first sending optical communication path is arranged in an outer peripheral part of the first optical fiber, the second sending optical communication path is arranged in a central part of the second optical fiber, the second receiving optical communication path is arranged in an outer peripheral part of the second optical fiber, an outer diameter of the central part of the first optical fiber is equivalent to an outer diameter of the central part of the second optical fiber, and a central axis of the first optical fiber is coincident with a central axis of the second optical fiber.

Effect of the Invention

According to the present invention, a rotary optical link joint with a small change in transmission loss during a rotational use may be provided. Particularly, the present invention may be suitably used for a rotary optical link joint with a small entire diameter since the joint space must be narrowed in order to suppress the interference.

BRIEF DESCRIPTION OF THE DRAWINGS

FIG. 13 (A) is a view looking at an incident end along an axis line, (B) is a view looking from the side, and (C) is a view looking at an emitting end along an axis line, of a hollow multi-core optical fiber, showing an optical path of an optical signal in a multi-core optical fiber.

FIG. 15 is a schematic view of a rotary optical link joint showing a process of interference generation.

FIG. 16 is a cross-sectional view of a rotary optical link joint showing an example of positions of emission areas and cores when the transmission loss is small.

DESCRIPTION OF REFERENCE NUMERALS

1 . . . Rotary optical link joint; 10 . . . Holding member; 11 . . . First optical fiber; 11a . . . First sending optical communication path; 11b . . . First receiving optical communication path; 12 . . . Outer peripheral part optical communication path of a first optical fiber; 13 . . . Central part optical communication path of a first optical fiber; 14 . . . Pipe inside a first optical fiber; 15 . . . Hollow multi-core plastic optical fiber; 16 . . . Multi-core plastic optical fiber; 17 . . . First light-emitting element; 18 . . . First light-receiving element; 19 . . . Central axis (axis line) of a first optical fiber; 20 . . . Holding member; 21 . . . Second optical fiber; 21a . . . Second sending optical communication path; 21b . . . Second receiving optical communication path; 22 . . . Outer peripheral part optical fiber of a second optical fiber; 23 . . . Central part optical fiber of a second optical fiber; 24 . . . Pipe inside a second optical fiber; 25 . . . Hollow multi-core plastic optical fiber; 26 . . . Multi-core plastic optical fiber; 27 . . . Second light-emitting element; 28 . . . Second light-receiving element; 29 . . . Central axis (axis line) of a second optical fiber; 31 . . . Tubular structure; 32 . . . Magnetic fluid; 33 . . . Magnet ring; 34 . . . Tubular structure covering a first optical fiber; 35 . . . Tubular structure covering a second optical fiber; 36 . . . Permanent magnet; 37 . . . Magnetic fluid; 38 . . . Adhesive; 39 . . . Bearing; 40 . . . Holding member

MODE FOR CARRYING OUT THE INVENTION

The mode for carrying out the present invention (hereinafter, simply referred to as the "present embodiment") will be described below in detail. The following present embodiment is an exemplification for explaining the present invention and is not intended to limit the present invention to the following content.

(Embodiment 1)

Figure 1:
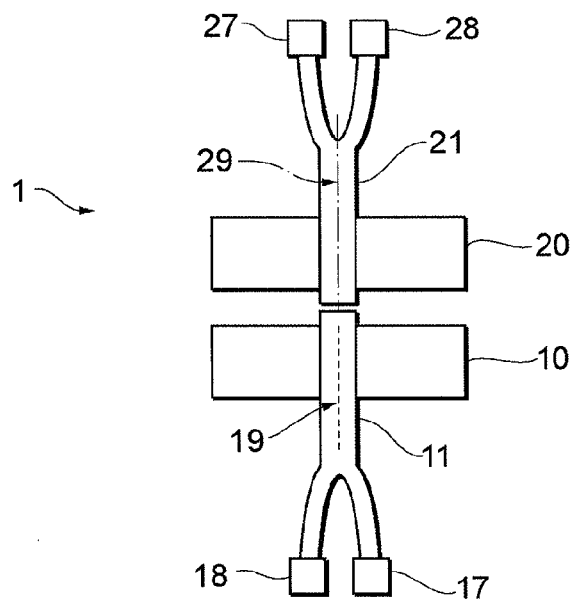
FIG. 1 is a schematic view showing a configuration of a rotary optical link joint according to an embodiment of the present invention.

FIG. 1 is a schematic view showing a configuration of a rotary optical link joint 1 according to the present embodiment. The rotary optical link joint 1 comprises a first optical fiber 11, a part or all of which is configured by a multi-core fiber; a second optical fiber 21, a part or all of which is configured by a multi-core fiber, and which is connected in series with the first optical fiber 11 with an optically communicable space therebetween in an axial direction of the first optical fiber 11 (in other words, provided in an optically communicable manner, even if a space physically exists); and holding members 10 and 20 that hold the first optical fiber 11 and the second optical fiber 21. The holding members 10 and 20 cause an end of the first optical fiber 11 and an end of the second optical fiber 21 to face each other and hold them in an optically communicable state. A shape that is easy to hold is preferable (see FIG. 1). Among the end surfaces of the first optical fiber 11, the surface which does not face the second optical fiber 21 is an input/output end surface of the first optical fiber. Among the end surfaces of the second optical fiber 21, the surface which does not face the first optical fiber 11 is an input/output end surface of the second optical fiber.

The multi-core optical fiber used herein refers to an optical fiber in which: 1) a transverse plane in a fiber diameter direction has a sea-island structure; 2) the island consists of a core which is to be an optical waveguide and a sheath that surrounds the core and has a refractive index lower than that of the core; 3) the sea consists of a third substance other than the core and the sheath; and 4) a plurality of cores exists inside the same fiber. However, the substance used as the sea and the substance used as the sheath may be the same. If the same substances are used as described, the core will be the island of the sea-island structure with the sheath being the sea.

As described above, in the multi-core optical fiber, the island, i.e. the core, is fixed by the sea part of the sea-island structure. Thus, the position of the core barely changes during the use of the multi-core optical fiber, and hence the change in transmission loss is extremely small.

The rotary optical link joint having a structure with a plurality of bundle single-core optical fibers as disclosed in patent document 1 has a difficulty, due to the following reasons, in reducing the performance variation between each of the solid substances when a plurality of rotary optical link joints is manufactured, thereby having a problem of not being suitable for industrial production. The reasons therefor will be described below.

As described above, when the space between the joints is narrowed, the transmission loss that occurs between the joints largely varies depending on the positions of the cores in both joints. In the case of the rotary optical link joint having a structure with a plurality of bundle single-core optical fibers, it is extremely difficult, in a step of bundling the optical fibers, to cause the positions of the cores in the joint to be the same in each rotary optical link joint, and the positions of the cores in the joint tend to be different in each rotary optical link joint. Therefore, it is difficult to produce a plurality of rotary optical link joints with a constant transmission loss, and such rotary optical link joint is not suitable for industrial production.

However, in the rotary optical link joint according to the present embodiment, the above problem can be solved by configuring a part or all of the first optical fiber and the second optical fiber by a multi-core plastic optical fiber having a plurality of cores.

The multi-core plastic optical fiber refers to a plastic optical fiber that is manufactured through a multi-component fiber spinning die after fusing a transparent core resin with a sheath resin that has a lower refractive index than that of the core resin, in which: 1) a transverse plane has a sea-island structure; 2) the island consists of a sheath resin and a core resin that has a higher refractive index than that of the sheath resin; 3) the sea consists of a third resin; and 4) the core resin is surrounded by the sheath resin. The third resin may be selected by appropriately combining polymethyl methacrylate resin, polycarbonate resin, etc. The resin used for the sea and the sheath resin may be the same. In such a case, the core resin is the island of the sea-island structure and the sheath resin is the sea.

The multi-core plastic optical fiber may be manufactured by, for example, a method disclosed in WO98/35247, a method disclosed in JP2000-89043 A, or other well-known methods.

As described above, the core resin and the sheath resin are always spun in a multi-component fiber spinning die under a constant condition, thereby enabling a plurality of multi-core plastic optical fibers, each having the same core position, to be manufactured, and when a plurality of rotary optical link joints is produced, it would be easy to have the same core position in the joint for each rotary optical link joint. Therefore, a variation in transmission loss is less likely to occur in each rotary optical link joint, and it is capable of producing a plurality of rotary optical link joints having a constant transmission loss.

In addition, if a part or all of the first optical fiber and/or the second optical fiber is configured by the multi-core plastic optical fiber, the bandwidth of the optical signal to be transmitted can be largely increased, thereby being preferable. The reasons therefor will be described below.

Figure 14C:
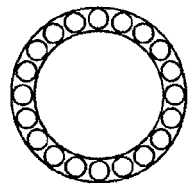
FIG. 14 (A) is a view looking at an incident end along an axis line, (B) is a view looking from the side, and (C) is a view looking at an emitting end along an axis line, of a bundle optical fiber, showing an optical path of an optical signal in the bundle optical fiber as a reference comparative example.
Figure 14B:
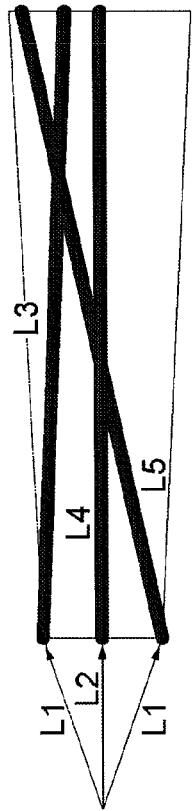
Figure 14A:
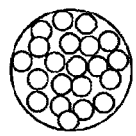
Figure 17:
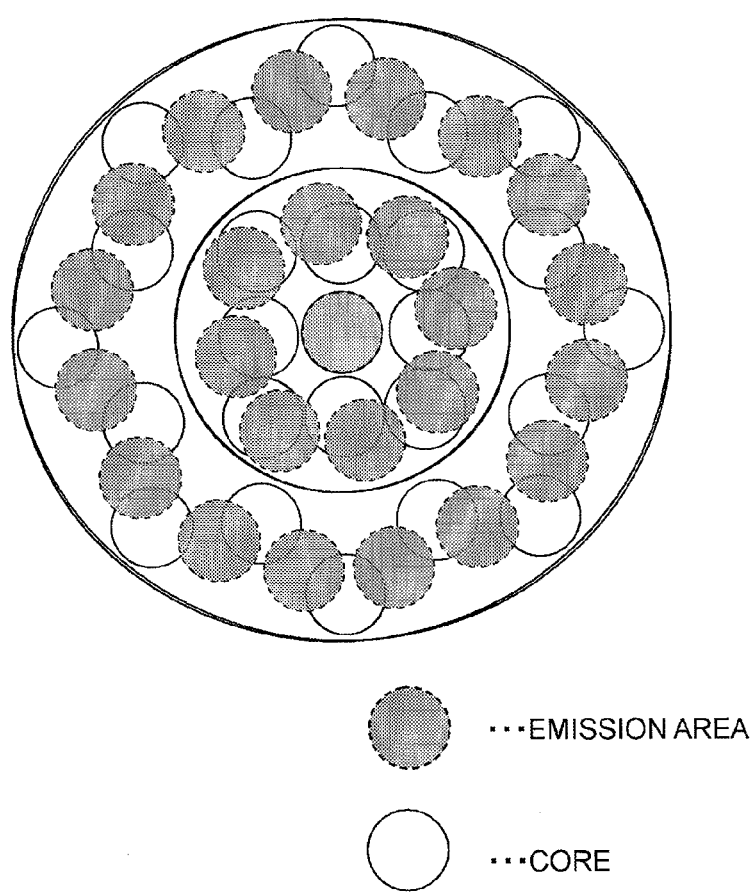
FIG. 17 is a cross-sectional view of a rotary optical link joint showing an example of positions of emission areas and cores when the transmission loss is large.

In the case of a rotary optical link joint having a structure with a plurality of bundle single-core optical fibers as disclosed in patent document 1, the following reasons, i.e. a) a difference in optical path length occurs depending on which optical path the light travels along, and b) the entire diameter is large since a plurality of optical fibers is bundled, and the transmission distance from the light source to the fiber end surface is largely different between the center of the fiber and the outer peripheral part of the fiber, are causes for the narrowing of the bandwidth of the optical signal. Namely, the transmission distance from the light source to the fiber end surface is different between distance L1, which is until the center of the fiber, and distance L2, which is until the periphery of the fiber. Furthermore, distances L3, L4 and L5 of each of the cores in the bundle are also different depending on the position, the degree of twisting, etc., of each optical fiber in the bundle (see FIG. 14 (A)-(C)). Particularly, in a bundle optical fiber in which the optical fibers are bundled in a circle at the incident end of the fiber (see FIG. 14(A)) and the optical fibers are bundled so as to gradually spread into an annular form at the other end (emitting end) (see FIGS. 14 (B) and (C)), a difference in each transmission distance is likely to occur. Therefore, when the optical signal transmitted by such bundle optical fiber is synthesized, the signal would be synthesized in a state with an incorrect timing due to the difference in the optical path length, thereby causing an effective band (overlapping band) to be narrowed by the corresponding amount.

With respect to this, when a multi-core plastic optical fiber is used as a first optical fiber and/or a second optical fiber, it is easier to have a smaller rotary optical link joint than the conventional one using a bundle optical fiber. Thus, since it is capable of decreasing the difference between the distance L1 from the light source to the fiber center and the distance L2 from the light source to the fiber periphery, the deviation in frequency of the signal due to the difference in the optical path length would be small, thereby allowing a wider band.

Namely, since the single-core optical fiber used in a bundle optical fiber has a diameter of the core part (core diameter), through which the light passes, of several μm to 10 μm, whereas the entire outer diameter of one optical fiber is often set to be, for example, a little higher than 100 μm as a size that is not for an optical demand but is instead for maintaining the intensity so as to avoid a breaking of wire due to manufacture, the diameter of the optical fiber would be extremely large when many of them are bundled. However, if a multi-core plastic optical fiber is used for the first optical fiber and/or the second optical fiber, there is no need to bundle a plurality of optical fibers, and the outer diameter of one multi-core plastic optical fiber and the outer diameter of one single-core optical fiber would be substantially the same. Thus, the entire diameter would become extremely small, thereby allowing the difference between the distance L1 from the light source to the fiber center and the distance L2 from the light source to the fiber periphery to be extremely small.

In addition, when the multi-core plastic optical fiber is used, since each of the cores is parallel and the core position is fixed due to its properties, the transmission distance M2 from the incident end to the emitting end in the multi-core optical fiber would be substantially the same even if light was incident on any core (see FIGS. 13(A)-(C)).

Therefore, when an optical signal is transmitted by a multi-core optical fiber in such rotary optical link joint, a deviation in the timing of a signal due to the difference in an optical path length is less likely to occur. Therefore, the effective band can be prevented from being narrowed when the transmitted optical signal is synthesized.

When the rotary optical link joint 1 according to the present embodiment is used for two-way communication, the input/output end surfaces of the first optical fiber 11 and the second optical fiber 21 may be branched, for example into two, and one of the two may be connected to an optical signal transmitting means such as a light-emitting element, while the other may be connected to an optical signal receiving means such as a light-receiving element (see FIG. 1). Here, the optical signal transmitting means and the optical signal receiving means which are connected to the first optical fiber 11 are referred to as first optical signal transmitting means and first optical signal receiving means, respectively, and the optical signal transmitting means and the optical signal receiving means which are connected to the second optical fiber 21 are referred to as second optical signal transmitting means and second optical signal receiving means, respectively. Similarly, the light-emitting element and the light-receiving element which are connected to the first optical fiber 11 are referred to as a first optical fiber light-emitting element 17 and a first optical fiber light-receiving element 18, respectively, while the light-emitting element and the light-receiving element which are connected to the second optical fiber 21 are referred to as a second optical fiber light-emitting element 27 and a first optical fiber light-receiving element 28, respectively.

The first optical fiber light-emitting element 17 and the second optical fiber light-emitting element 27 which are used as optical signal transmitting means may, respectively, be one or more. Moreover, the second optical fiber light-receiving element 18 and the second optical fiber light-receiving element 28 which are used as optical signal receiving means may, respectively, be one or more. The optical signal transmitting means and the optical signal receiving means may include light guide means such as lenses or the like.

Although there is no specific detail in the present embodiment, a single light-emitting element may serve as the first optical fiber light-emitting element 17 and the second optical fiber light-emitting element 27. Similarly, a single light-receiving element may serve as the second optical fiber light-receiving element 18 and the second optical fiber light-receiving element 28.

Figure 2:
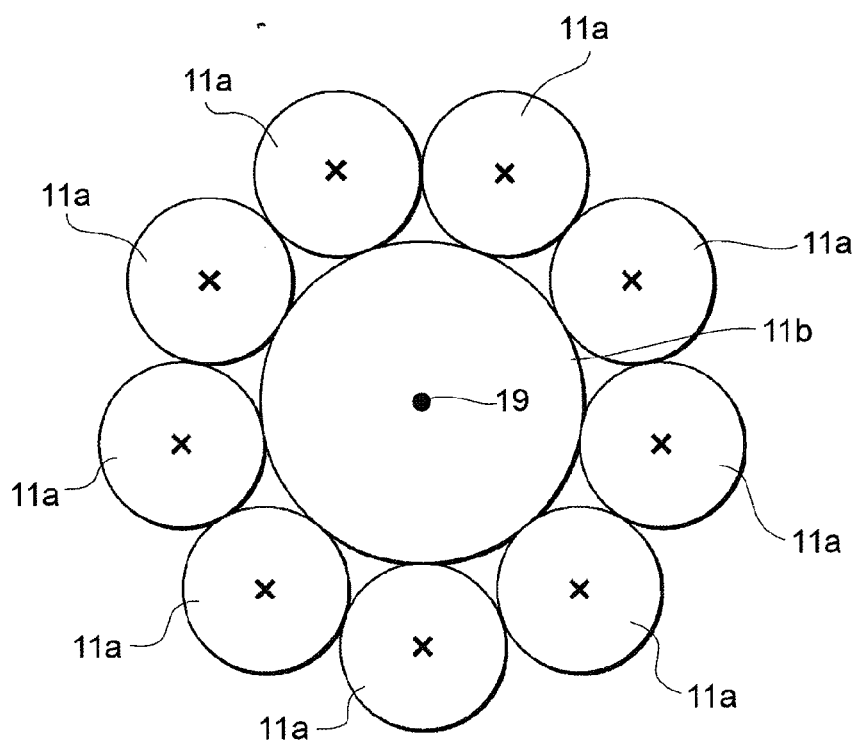
FIG. 2 is a cross-sectional view of a first optical fiber showing a first mode of a position of an optical communication path in the first optical fiber.

Of the cores included in the first optical fiber 11, the core through which the optical signal transmitted from the first optical signal transmitting means is referred to as a first sending light communication path 11a, and the core through which the optical signal received by the first optical signal receiving means is referred to as a first receiving light communication path 11b (see FIG. 2, etc.). Of the cores included in the second optical fiber 21, the core through which the optical signal transmitted from the second optical signal transmitting means is referred to as a second sending light communication path 21a, and the core through which the optical signal received by the second optical signal receiving means is referred to as a second receiving light communication path 21b. Well-known means may be used for incident means to the core for the optical signal that is transmitted from the optical signal transmitting means such as a light-emitting element, and light collection, etc., such as through lenses, may be considered.

Similarly, the optical signal that is emitted from the core may be collected by well-known collecting means, such as lenses, and received by optical signal receiving means such as a light-receiving element.

The first sending optical communication path 11a and the first receiving optical communication path 11b are provided in a state in which both are blocked from light. Similarly, the second sending optical communication path 21a and the second receiving optical communication path 21b are provided in a state in which both are blocked from light.

When a two-way communication is performed, each of the cores may be arranged such that the optical signal that is emitted from the first sending optical communication path 11a is incident on the second receiving optical communication path 21b and such that the optical signal that is emitted from the second sending optical communication path 21a is incident on the first receiving optical communication path 11b. The sending optical communication path and the receiving optical communication path through which the same optical signal passes are herein referred to as the channel.

As in FIG. 2, a preferable position of the cores included in the first optical fiber 11 and the second optical fiber 21 may be considered to be such that either one of the sending optical communication path 11a or the receiving optical communication path 11b is arranged by focusing the optical communication path within a circumference of a certain radius centered around a central axis (axis line) 19 of the first optical fiber 11, and the other optical communication path is arranged outside the circumference.

Figure 3:
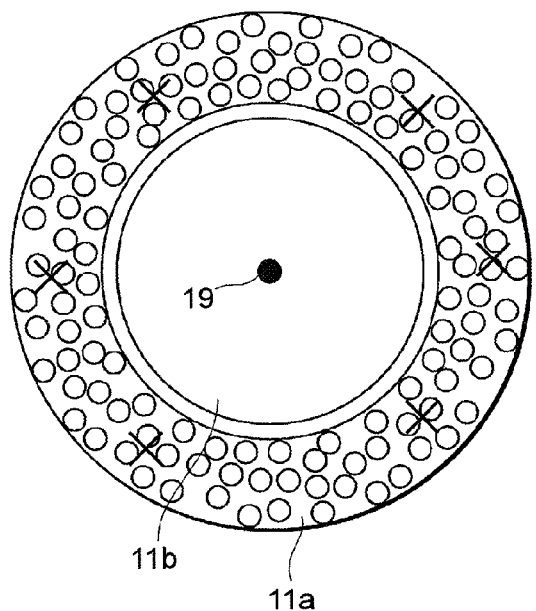
FIG. 3 is a cross-sectional view of a first optical fiber showing a second mode of a position of an optical communication path in the first optical fiber.

An example of the first receiving optical communication path 11b being arranged inside the circumference and the first sending optical communication path 11a being arranged outside the circumference will be described below (see FIGS. 3 and 4).

Figure 4:
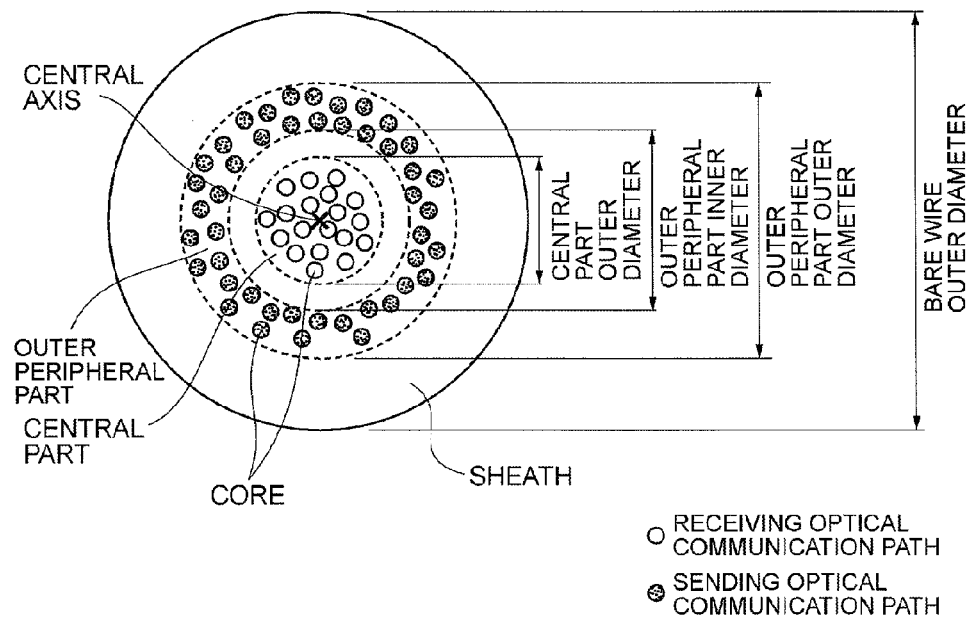
FIG. 4 is a cross-sectional view showing a bare wire outer diameter of an optical fiber comprising a receiving optical communication path and a sending optical communication path.

In a transverse plane in a radial direction of the first optical fiber 11, the diameter of a circle with a minimum radius, that is depicted so as to include the cores of the first receiving optical communication 11b and be centered around the central axis 19, is the central part outer diameter, and the inside of the diameter is the central part (see FIG. 4). The diameter of the circle that is outside the central part and that has a minimum radius that is depicted, with the central axis 19 as its center, so as to contact the cores which exist outside the central part, is the outer peripheral part inner diameter. The diameter of the circle that is outside the outer peripheral part inner diameter and that has a minimum radius that is depicted, with the central axis 19 as its center, so as to include all the cores included in the first optical fiber 11, is the outer peripheral part outer diameter. The part outside the outer peripheral part inner diameter and inside the outer peripheral part outer diameter is referred to as the outer peripheral part.

It is preferable to connect the core that exists in the central part of the first optical fiber with the optical signal receiving means for receiving the optical signal that is emitted from the core, and to connect the core that exists in the outer peripheral part with the optical signal transmitting means for causing the optical signal to be incident on the core.

Similar to the first optical fiber 11, also regarding the second optical fiber 21, either one of the sending optical communication path 21a or the receiving optical communication path 21b is arranged by focusing the optical communication path within a circumference of a certain radius centered around a central axis (axis line) 29 of the second optical fiber 21, and the other optical communication path is arranged outside the circumference.

An example of the second sending optical communication path 21a being arranged inside the circumference and the second receiving optical communication path 21b being arranged outside the circumference will be described below.

The definitions of the terms central part, outer peripheral part, central part outer diameter, outer peripheral part inner diameter and outer peripheral part outer diameter in the second optical fiber 21 are defined in the same way as the central part, outer peripheral part, central part outer diameter, outer peripheral part inner diameter and outer peripheral part outer diameter in the first optical fiber 11 except that the second sending optical communication path 21a replaces the first receiving optical communication path 11b and the second receiving optical communication path 21b replaces the first sending optical communication path 11a.

It is preferable to connect the core that exists in the central part of the second optical fiber with the optical signal transmitting means for causing the optical signal to be incident on the core, and to connect the core that exists in the outer peripheral part with the optical signal receiving means for receiving the optical signal that is emitted from the core.

In order to suppress interference, it is preferable for each size of the central part outer diameter, outer peripheral part inner diameter and outer peripheral part outer diameter in the first optical fiber 11 to be substantially the same as each size of the central part outer diameter, outer peripheral part inner diameter and outer peripheral part outer diameter in the second optical fiber.

The cores included in the central part and the outer peripheral part may be arranged at random, and the corresponding sending optical communication path and receiving optical communication path may be arranged on the circumference of the circle centered around the central axis 19. The random arrangement is favorable in terms of manufacturing cost, and the arrangement on the circumference is favorable in terms of efficiency for light utilization.

If the difference in signal strength between the signal that passes through the central part and the signal that passes through the outer peripheral part is large, when interference occurs, the signal with a smaller signal strength is strongly affected by the interference signal of the signal with a larger signal strength. Therefore, it is preferable for the signal strength of the signal that passes through each channel to be the same to the extent possible. In view of the above, regarding the central part and the outer peripheral part, the respective central part outer diameters in the first optical fiber 11 and the second optical fiber 21 are, preferably, 0.1-0.9 times the outer peripheral part outer diameters of the first optical fiber 11 and the second optical fiber, are more preferably, 0.2-0.85 times the same, and are even more preferably, 0.3-0.8 times the same.

The outer peripheral part outer diameter in the first optical fiber 11 and the outer peripheral part outer diameter in the second optical fiber 21 may be different. However, in order to improve the efficiency for light utilization, it is preferable that the outer peripheral part outer diameter in the first optical fiber 11 and the outer peripheral part outer diameter in the second optical fiber 21 are substantially the same.

The larger the percentage of the cores in the central part and outer peripheral part of the first optical fiber 11 and the second optical fiber 21, the greater the capability to suppress the improper connection during the rotation of the rotary light link joint 1, thereby being preferable. Although there is no specific limitation regarding the lower limit for percentage of the cores, it would be sufficient if the percentage of the cores in the central part and the outer peripheral part was 40% or higher, more preferably, 50% or higher, and even more preferably, 60% or higher.

When a multi-core optical fiber is used for the first optical fiber 11 and the second optical fiber 21, the bare wire outer diameters of the first optical fiber 11 and the second optical fiber 21 are, preferably, 0.2 mm-4.0 mm, more preferably, 0.3 mm-3.5 mm, even more preferably, 0.4 mm-3.0 mm, and still more preferably, 0.5 mm-2.0 mm. In the above range, the difference in transmission distance from the light source to the fiber end surface is sufficiently small between the fiber center and the fiber periphery, thereby being preferable. The diameter of the core is, preferably, 2-500 μm, more preferably, 10-250 μm, and even more preferably, 20-200 μm (see FIG. 11). If the diameter of the core is within the above range, a sufficient number of cores can be ensured even if the bare wire outer diameter is within the above range.

Particularly, the ratio of the total sum of the cross-sectional area of the cores of the sending optical communication path 11a to the total sum of the cross-sectional area of the cores of the receiving optical communication path 11b in the transverse plane of the first optical fiber 11 is, preferably, in the range of 1 to 10-10 to 1, and more preferably, in the range of 1 to 5-5 to 1.

Moreover, the ratio of the total sum of the cross-sectional area of the cores of the sending optical communication path 21a to the total sum of the cross-sectional area of the cores of the receiving optical communication path 21b in the transverse plane of the second optical fiber 21 is, preferably, in the range of 1 to 10-10 to 1, and more preferably, in the range of 1 to 5-5 to 1.

Figure 11:
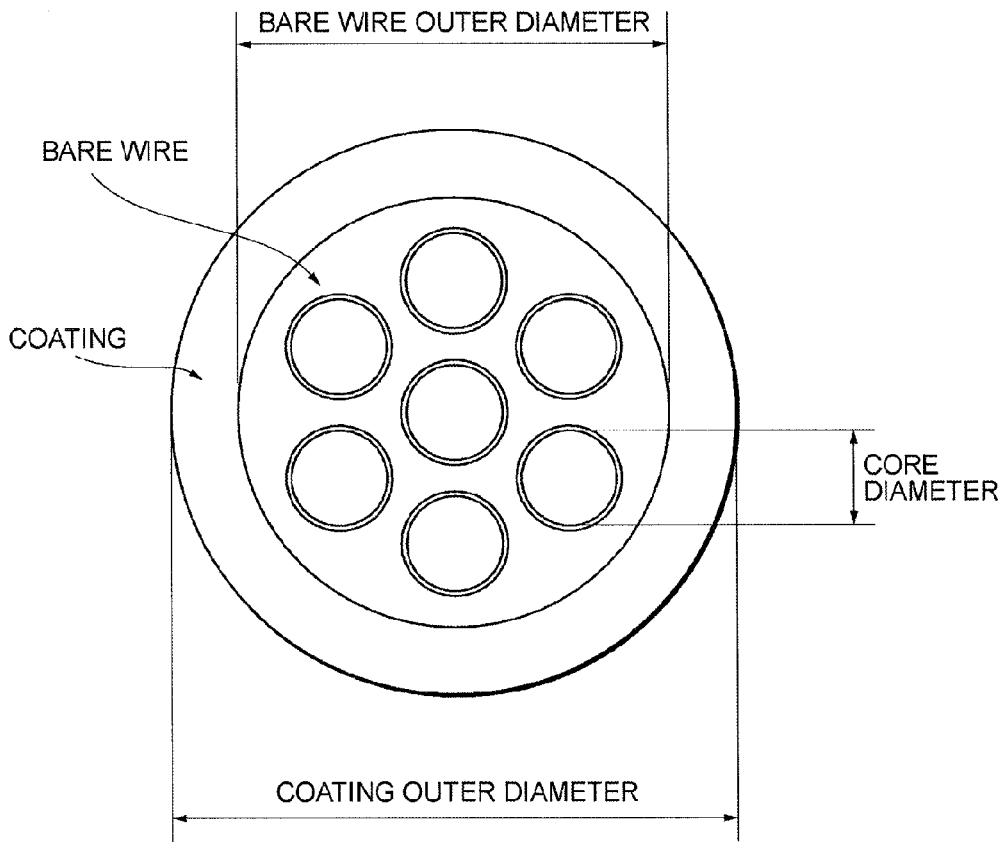
FIG. 11 is a cross-sectional view showing each of the outer diameters, etc. of an optical fiber comprising a bare wire and a coating.

The first optical fiber 11 and the second optical fiber 21 may be provided with a covering layer for protection (see FIG. 11). The thicker the covering layer, the stronger the machine strength. However, it is suitable for the covering layer to be used with a thickness of about 50 μm to 1 mm in terms of economic efficiency and balance.

(Embodiment 2)

Figure 5:
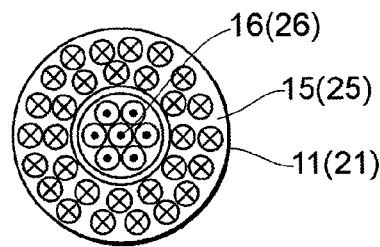
FIG. 5 is a cross-sectional view of the first (second) optical fiber showing an embodiment using a hollow multi-core plastic optical fiber.

Another preferable embodiment may be a configuration in which at least one of the first optical fiber 11 and the second optical fiber 21 is configured by a hollow multi-core optical fiber with a hollow part in the fiber center and an optical fiber that is inserted into the hollow part of the hollow multi-core optical fiber (see FIG. 5, etc.). The hollow multi-core optical fiber is, preferably, a hollow multi-core plastic optical fiber having a hollow part in the fiber center that is manufactured through a multi-component fiber spinning die after fusing a transparent core resin with a sheath resin that has a lower refractive index than that of the core resin. The transverse plane of the hollow multi-core plastic optical fiber is formed from a hollow part and an outer peripheral layer outside the hollow part, and the outer peripheral layer 1) has a sea-island structure; 2) the island consists of a sheath resin and a core resin that has a higher refractive index than that of the sheath resin; 3) the sea layer consists of a third resin; and 4) the core resin is surrounded by the sheath resin.

The third resin may be selected by appropriately combining polymethyl methacrylate resin, polycarbonate resin, etc. The resin used for the sea layer and the sheath resin may be the same. In such a case, the core resin is the island of the sea-island structure and the sheath resin is the sea.

Although there is no specific limitation for the optical fiber inserted into the hollow part, due to the reason described above, the optical fiber is, preferably, a multi-core optical fiber, and more preferably, a multi-core plastic optical fiber.

When the above rotary optical link joint is used for a two-way communication, either the hollow multi-core optical fiber or the optical fiber inserted into the hollow part which constitutes the first optical fiber 11 and the second optical fiber 21 may be connected to the optical signal transmitting means, and the other may be connected to the optical signal receiving means. An explanation is made in the following regarding a state wherein the optical signal transmitting means is connected to the hollow multi-core plastic optical fiber that constitutes the first optical fiber 11 and the optical signal receiving means is connected to the multi-core plastic optical fiber inserted into the hollow part, respectively, and the optical signal receiving means is connected to the hollow multi-core plastic optical fiber that constitutes the second optical fiber 21 and the optical signal transmitting means is connected to the multi-core plastic optical fiber inserted into the hollow part, respectively.

The definitions of the central part, outer peripheral part, central part outer diameter, outer peripheral part inner diameter and outer peripheral part outer diameter are the same as those in Embodiment 1.

In the case of the rotary optical link joint of the above configuration, since the sending optical communication path and the receiving optical communication path can be produced by separate optical fibers, the connection between the optical signal transmitting means and the optical signal receiving means would be easy, thereby being preferable. More specifically, a hole may be made in the middle of the hollow multi-core plastic optical fiber 15 (25), the multi-core plastic optical fiber 16 (26) that was inserted in the hollow part may be taken out from the hole, and then each multi-core plastic optical fiber 16 (26) may be connected to the optical signal transmitting means and the optical signal receiving means, thereby facilitating the manufacture of a multi-channel rotary optical link joint. The way to open such a hole includes, a method of cutting along the core with a thin cutter such as a razor, a method using a needle probe, a method using a laser, etc. A method of tearing apart the edge or the middle part of the hollow multi-core plastic optical fiber 15 (25) instead of opening a hole may also be used.

Furthermore, in the case of the above configuration, since the number of channels can be increased only by newly inserting the first optical fiber 11 and the second optical fiber 21 into the hollow part of the hollow multi-core plastic optical fiber, channels are easily added.

When a hollow multi-core optical fiber is used for the first optical fiber 11 and the second optical fiber 21, the bare wire outer diameters of the first optical fiber 11 and the second optical fiber 21 are, preferably, 0.2 mm-4.0 mm, more preferably, 0.3 mm-3.5 mm, and even more preferably, 0.4 mm-3.0 mm. The diameter of the core is, preferably, 2-500 µm, more preferably, 10-250 µm, and even more preferably, 20-200 µm. The diameter (inner diameter) of the hollow part is, preferably, 0.2-0.9 times the outer peripheral part outer diameter, more preferably, 0.25-0.85 times the same, and even more preferably, 0.3-0.8 times the same.

(Embodiment 3)

Although the rotary optical link joint according to the embodiment described above is an example of only a two-way communication, the above rotary optical link joint may also be used as a rotary optical link joint of a one-way communication.

Namely, the first optical fiber may be connected, at the input/output end surface of the first optical fiber, to first central part optical signal transmitting means for causing the optical signal to be incident on a part or all of the cores that exist in the circular area sectioned by a concentric circle that is centered around the axis line and to first outer peripheral part optical signal transmitting means for causing an optical signal to be incident on a part or all of the cores that exist in the area other than the circular area, and the second optical fiber may be connected, at the input/output end surface of the second optical fiber, to second central part optical signal receiving means for receiving an optical signal that is emitted from a part or all of the cores that exist in the circular area sectioned by a concentric circle that is centered around the axis line and to second outer peripheral part optical signal receiving means for receiving the optical signal that is emitted from a part or all of the cores that exist in the area other than the circular area.

In the case where the first optical fiber is constituted from a hollow multi-core optical fiber and an optical fiber inserted into a hollow part of the hollow multi-core optical fiber, the hollow multi-core optical fiber constituting the first optical fiber may be connected to the first outer peripheral part optical signal transmitting means for causing the optical signal to be incident on a part or all of the cores in the hollow multi-core optical fiber, and the optical fiber inserted into the hollow part of the hollow multi-core optical fiber constituting the first optical fiber may be connected to the first central part optical signal transmitting means for causing the optical signal to be incident on a part or all of the cores in the optical fiber inserted into the hollow part of the hollow multi-core optical fiber. Similarly, in the case where the second optical fiber is constituted from a hollow multi-core optical fiber and an optical fiber inserted into a hollow part of the hollow multi-core optical fiber, the hollow multi-core optical fiber constituting the second optical fiber may be connected to the second outer peripheral part optical signal receiving means for receiving an optical signal that is emitted from a part or all of the cores in the hollow multi-core optical fiber at the input/output end surface of the second optical fiber, and the optical fiber inserted into the hollow part of the hollow multi-core optical fiber constituting the second optical fiber may be connected to the second central part optical signal receiving means for receiving the optical signal emitted from a part or all of the cores in the optical fiber inserted into the hollow part of the hollow multi-core optical fiber.

The space between a first optical fiber and a second optical fiber is not particularly limited as long as the space is capable of optical communication. However, in order to decrease interference as well as increase the efficiency of optical signal utilization, the space between the fibers is, preferably, equal to or less than 3 times, more preferably, equal to or less than 2 times, and even more preferably, equal to or less than 1 time the larger one of the central part outer diameter of the first optical fiber 11 or the central part outer diameter of the second optical fiber 21. The smaller the space between the fibers, the smaller the interference, thereby being preferable. The smaller the deviation between a central axis of the first optical fiber and a central axis of the second optical fiber, the smaller the transmission loss generated between the fibers, thereby being preferable.

The lower limit for the space between the fibers is not particularly limited, and the first optical fiber and the second optical fiber may abut each other. When both fibers abut each other, upon rotational use, both fibers may be rubbed and dust may be generated. Thus, it is preferable that both fibers do not abut each other.

Interference may also be reduced by using an optical communication path of a low numerical aperture. On the contrary, if an optical communication path of a high numerical aperture is used, the tolerance of misalignment of the cores would be large. More specifically, when a multi-core optical fiber with a bare wire outer diameter of 400 μm and a numerical aperture of 0.6 is used for the first optical fiber and the second optical fiber, the fiber space is, preferably, equal to or less than 400 μm, and more preferably, equal to or less than 300 μm.

Figure 6:
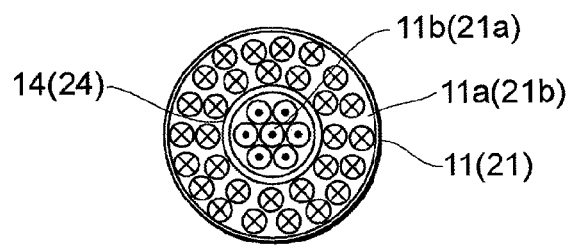
FIG. 6 is a cross-sectional view of the first (second) optical fiber showing an embodiment using a pipe in the first (second) optical fiber.
Figure 7:
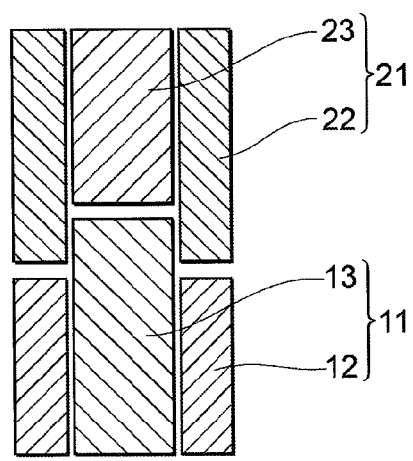
FIG. 7 is a cross-sectional view of an optical fiber showing an example in a concavo-convex shape that is capable of being fitted at a fiber connection part.

Possible methods for suppressing light leakage may include a method of covering the central parts and the outer peripheral parts of the first optical fiber 11 and the second optical fiber 21 with a pipe 14 in the first optical fiber and a pipe 24 in the second optical fiber, which are made of metal or resin, respectively, or a method of using an optical fiber cable which covers the optical fiber at the central part (see FIG. 6). Furthermore, as in FIG. 7, possible methods may also include a method of configuring the shape of the end surfaces of the first optical fiber 11 and the second optical fiber 21 to be capable of being fit to each other, with one of the end surfaces being a protrusion type and the other being a recess type. The structure of FIG. 7 not only has an effect of suppressing light leakage but also has an effect of increasing the positional accuracy when the second optical fiber 21 is rotated and an effect of increasing tolerance to vibration.

Figure 8:
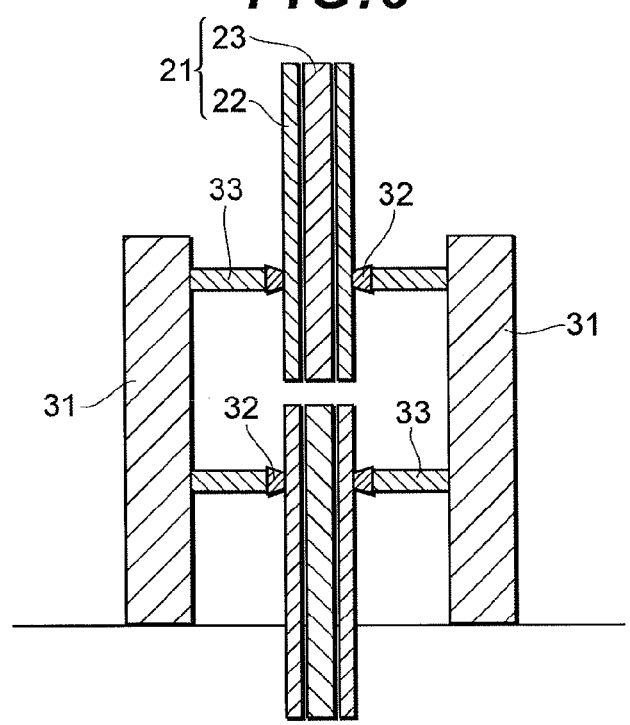
FIG. 8 is a cross-sectional view showing a configuration example of a fiber connection part and a tubular structure surrounding the fiber connection part, showing an example of a dustproof structure for preventing dirt, dust or gas from entering between communication paths.

When dust due to rubbing between two fibers or dust and gas, originating from outside, enter between the first optical fiber 11 and the second optical fiber 12, communication is interrupted, and this is not preferable. In order to prevent such dust from entering between the fibers, it is preferable to employ a dustproof structure at a connection part between the first optical fiber 11 and the second optical fiber 12. Specifically, a method of covering the connection part with, for example, a tubular structure 31 with a cross-section circular shape, may be included (see FIG. 8). If a magnetic fluid 32 (one of the functional fluids which is magnetic even though it is fluid) and a magnet ring 33 are used to seal between the tubular structure 31 and the first optical fiber 11 and the second optical fiber 21 as in FIG. 8, the dustproof effect is further increased, thereby being preferable. The magnet ring 33 may also serve for positioning the fixed optical fiber (for example, first optical fiber 11) and a rotatable optical fiber (for example, second optical fiber 21).

Figure 9:
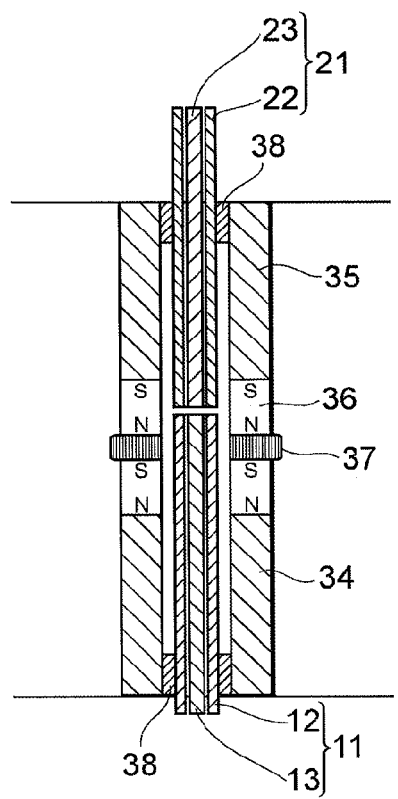
FIG. 9 is a cross-sectional view showing an example of a dustproof structure in which a permanent magnet is provided at an end surface of the tubular structure.
Figure 10:
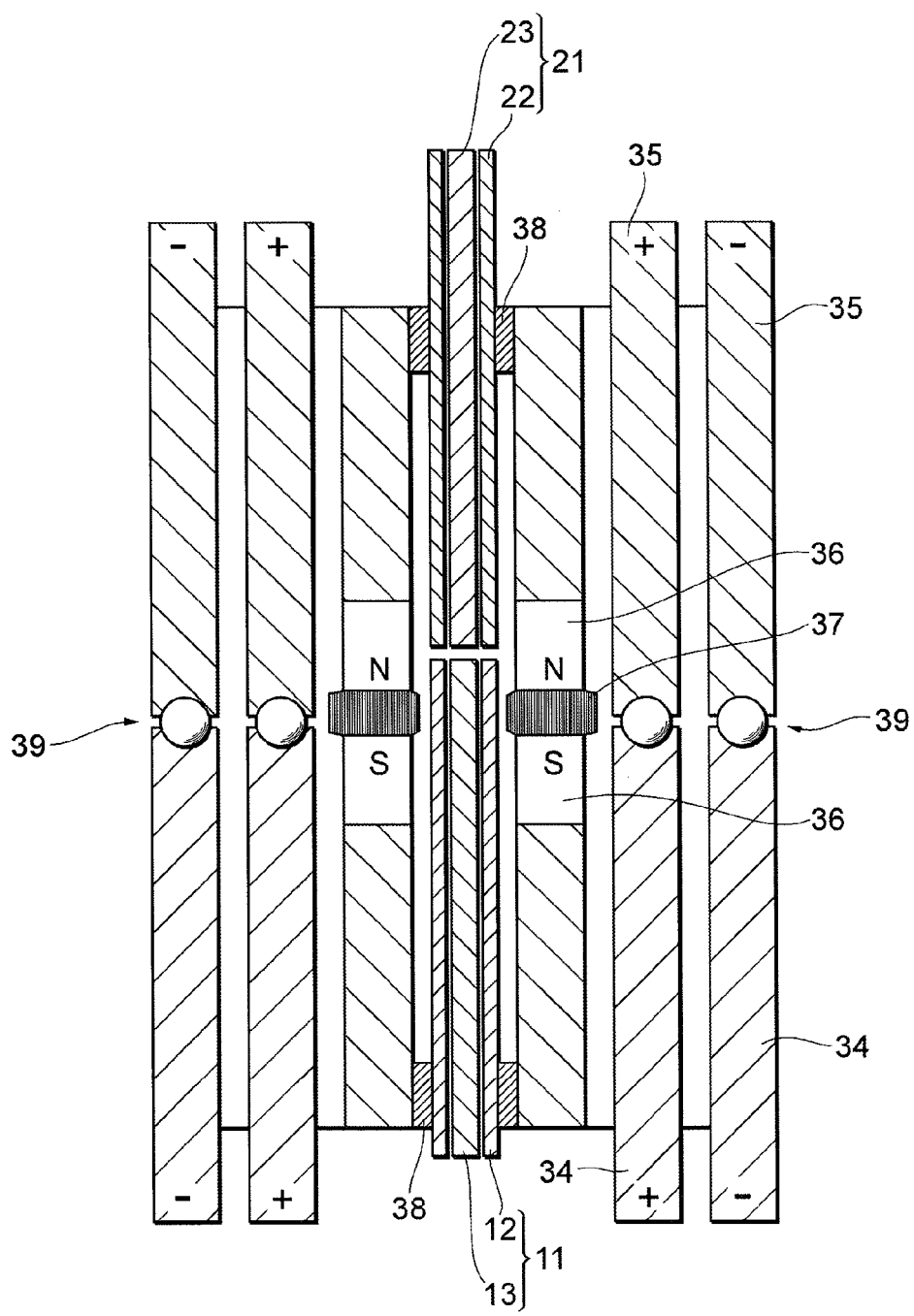
FIG. 10 is a cross-sectional view showing an example of the tubular structure which is an electrical structure.

As shown in FIG. 9, another structure may be a structure of connecting a tubular structure 34 that covers the first optical fiber 11 and a tubular structure 35 that covers the second optical fiber 21 in an axial direction of the first optical fiber 11, then providing a permanent magnet 36 to the end surfaces of the tubular structure 34 and the tubular structure 35 such that an N-pole and an S-pole are opposed to each other, respectively, and sealing between the permanent magnets 36 with the magnetic fluid 37.

Figure 12:
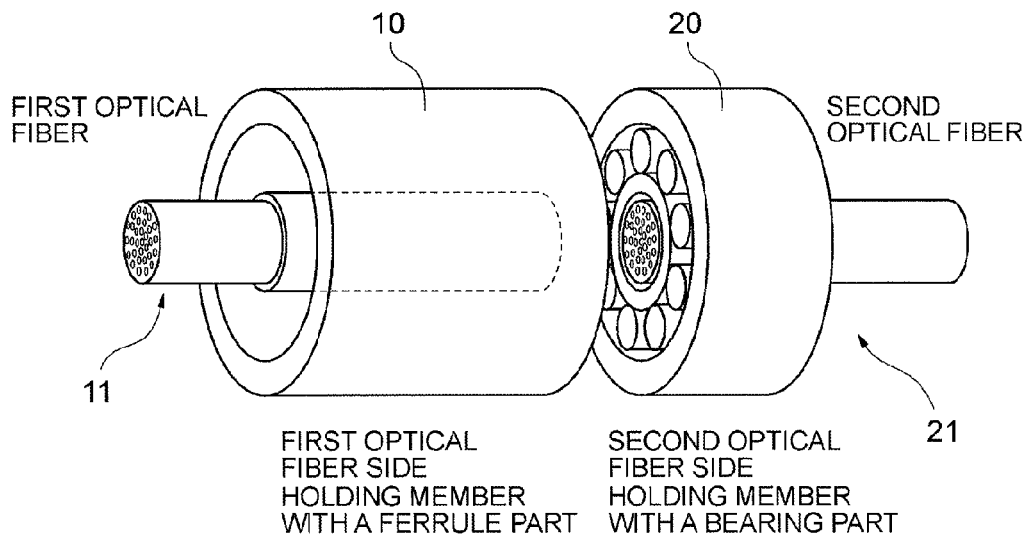
FIG. 12 is a perspective view showing a structural example of a holding member of a rotary optical link joint.

As shown in FIG. 12, holding members 10 and 20 may have a structure that is an integrated combination of a ferrule part that holds the first optical fiber 11 (the part shown with the numeral 10) and a bearing part that holds the second optical fiber 21 (the part shown with the numeral 20). The holding members 10 and 20 are integrated, and while the second optical fiber 21 is inserted and fixed in an inner rotational part of the bearing, the first optical fiber 11 is inserted and fixed in the ferrule part. This enables, at an end surface gap which defines the end surface of the first optical fiber 11 and the end surface of the second optical fiber 21, the end surfaces to be coincident with the central axis and to be opposed in parallel, as well as to hold a state in which a relative free rotation of the second optical fiber 21 is ensured by the bearing. Furthermore, since the holding members 10 and 20 are integrated, there also is a dustproof effect.

Configuring an electric transmission system outside an optical transmission system enables the first optical fiber 11 and the second optical fiber 21 to be relatively rotated by an electric drive. Specific examples of an electric transmission system may include, for example, a method using a brush or a roller contact, an electromagnetic derivation method using a supplying coil and a receiving coil, or a structure in which the tubular structure 34 is electrically connected to the tubular structure 35 with conductive substances, such as a ball made of metal or conductive resin and highly conductive gel therebetween, and a bearing 39 is further provided. Examples of an electric power source may include a power source mounted in the holding member 20, a battery associated outside the optical transmission system.

In all of the embodiments, the section used as a sending optical communication path and the section used as a receiving optical communication path may be switched. Namely, an exchange between the sending optical communication path 11a and the receiving optical communication path 11b, and an exchange between the sending optical communication path 21a and the receiving optical communication path 21b, are possible. The above exchange may be easily attained by switching the light-emitting element 17 with the light-receiving element 18, and the light-emitting element 27 with the light-receiving element 28. The channel does not have to be divided into two parts, the central part and the outer peripheral part, but also may be divided into three or more parts.

(Embodiment 4)

A rotary optical link joint may also be formed by a bundle fiber in which other optical fibers are bundled around the first optical fiber 11 and the second optical fiber 21. The surrounding other optical fibers are, preferably, multi-core optical fibers, and more preferably, multi-core plastic optical fibers, and also may be constituted by a hollow multi-core plastic optical fiber and an optical fiber inserted into the hollow part. When the rotary optical link joint is formed by a bundle fiber, it is preferable to fill the space between the optical fibers with resin, etc., and to fix the space such that the position of the optical fiber is not misaligned during a rotational use. In view of efficiency for light utilization, it is preferable that the other optical fibers are arranged on the same circumference centered around an axis line.

The rotary optical link joint according to the present invention may be suitably used as means for transmitting optical signals in electronic devices. For example, the rotary optical link joint may be used for optical signal transmission of a part that performs the operation of repeatedly folding, rotating, or folding and rotating a portable electronic device such as a mobile phone, PDA, mobile PC, video camera, digital still camera, game device mobile phone, laptop computer or mobile game device. When an electric signal is to be transmitted during such a use, in the case of an electric wire, the periphery must be covered by a shield for noise prevention. However, when an optical signal is transmitted by a flexible optical link joint according to the present invention, since a shield is unnecessary even for high-speed signals, the optical link joint may be made smaller and a rotational operation in both the forward and reverse directions is possible.

More specifically, it is preferable to use the rotary optical link joint according to the present invention for a portable electronic device comprising a first casing, a second casing and a hinge structural part which performs an operation of folding, rotating or folding and rotating in order to connect the two, in which a module in the first casing and a module in the second casing are connected by the rotary optical link joint.

The first casing and the second casing with a hinge structural part are rotatably connected by a rotational axis. The first module in the first casing and the second module in the second casing are connected so as to be capable of optical communication by the rotary optical link joint according to the present invention. When using a mobile phone as an example, the mobile phone has a structure in which two casings, being an upper casing with a display part and a lower casing with a control part, are connected by a hinge structural part. Since the hinge structural part performs an operation of folding, rotating, or folding and rotating to open and close the casing, if the rotary optical link joint according to the present invention is used between a display module (liquid crystal display) of the upper casing and a control module (printed circuit board) of the lower casing through the hinge structural part, a small and rotatable portable device may be realized. Particularly, a rotary optical link joint using a multi-core plastic optical fiber has a high flex resistance performance, and thus it is suitable for portable electronic devices which perform numerous folding operations.

Although the above embodiment is one example of a suitable implementation of the present invention, the embodiment is not limited thereto and may have various modifications within the scope that does not depart from the content of the present invention.

The present invention will be further described in detail below using examples. However, the present invention is not limited to these examples.

EXAMPLE 1

A first optical fiber 11 was configured by inserting a multi-core plastic optical fiber (37 cores, core diameter of 54 μm, bare wire outer diameter of 400 μm, coating outer diameter of 600 μm, length of 10 cm) into a hollow part of a hollow multi-core plastic optical fiber (380 cores, core diameter of 35 μm, bare wire inner diameter of 630 μm, bare wire outer diameter of 1000 μm, length of 10 cm). The outer peripheral part outer diameter of the first optical fiber 11 was 996 μm, the percentage of the cores of the optical communication path in the outer peripheral part was 79%, the central part outer diameter was 396 μm, and the percentage of the cores of the optical communication path in the central part was 69%. An optical communication path arranged in the outer peripheral part was used as a first sending optical communication path, and an optical communication path arranged in the central part was used as a first receiving optical communication path. The first sending optical communication path of the outer peripheral part and the first receiving optical communication path of the central part were both arranged in layers in a concentric manner centered around a central axis of the first optical fiber, with a predetermined space in between.

A second optical fiber 21 was configured by inserting a multi-core plastic optical fiber (37 cores, core diameter of 54 μm, bare wire outer diameter of 400 μm, coating outer diameter of 600 μm, length of 10 cm) into a hollow part of a hollow multi-core plastic optical fiber (380 cores, core diameter of 35 μm, bare wire inner diameter of 630 μm, bare wire outer diameter of 1000 μm, length of 10 cm). The outer peripheral part outer diameter of the second optical fiber 21 was 996 μm, the percentage of the cores of the optical communication path in the outer peripheral part was 79%, the central part outer diameter was 396 μm, and the percentage of the cores of the optical communication path in the central part was 69%. An optical communication path arranged in the outer peripheral part was used as a second receiving optical communication path, and an optical communication path arranged in the central part was used as a second sending optical communication path. The second receiving optical communication path of the outer peripheral part was arranged at the same location as that of the first sending optical communication path, and the second sending optical communication path of the central part was arranged at the same location as that of the first receiving optical communication path.

The first optical fiber 11 and the second optical fiber 21 were opposed to each other with a space of 300 μm in between. The edge of the hollow multi-core plastic optical fiber was cut along the core, the multi-core plastic optical fiber of the hollow part was taken out, and was coupled to a laser diode (manufactured by NEC Corporation, model number NX5317EH) with a wavelength of 1.3 μm, as a light-emitting diode, and to a photodiode (manufactured by Hamamatsu Photonics Corporation, model number G9820) as a light-receiving element. While rotating the rotational part with a speed of 10 RPM, a NRZ (Non Return to Zero) signal with a data rate of 1.5 Gb/s was input, as a signal, into a drive circuit of the laser diode in a PRBS (pseudo-random number bit string) PN31 format. As a result of measuring the bit error rate (BER) from the output of the photodiode receiving circuit, BER was found to be $1\times10^{-12}$ or below in both directions.

EXAMPLE 2

A hollow multi-core plastic optical fiber (380 cores, core diameter of 27 μm, bare wire inner diameter of 630 μm, bare wire outer diameter of 1000 μm, length of 10 cm) was used as an outer peripheral part of a first optical fiber 11, and a multi-core plastic optical fiber 16 (37 cores, core diameter of 42 μm, bare wire outer diameter of 400 μm, coating outer diameter of 600 μm, length of 10 cm) was used as a central part. The outer peripheral part outer diameter of the first optical fiber 11 was 990 μm, the percentage of the cores of the optical communication path in the outer peripheral part was 49%, the central part outer diameter was 385 μm, and the percentage of the cores of the optical communication path in the central part was 44%. An optical communication path arranged in the outer peripheral part was used as a first sending optical communication path, and an optical communication path arranged in the central part was used as a first receiving optical communication path. The first sending optical communication path of the outer peripheral part and the first receiving optical communication path of the central part were both arranged in layers in a concentric manner centered around a central axis of the first optical fiber, with a predetermined space in between.

A hollow multi-core plastic optical fiber (380 cores, core diameter of 27 µm, bare wire inner diameter of 630 µm, bare wire outer diameter of 1000 µm, length of 10 cm) was used as an outer peripheral part of a second optical fiber 21, and a multi-core plastic optical fiber (37 cores, core diameter of 42 µm, bare wire outer diameter of 400 µm, coating outer diameter of 600 µm, length of 10 cm) was used as a central part. The outer peripheral part outer diameter of the second optical fiber 21 was 990 µm, and the percentage of the cores of the optical communication path in the outer peripheral part was 49%, the central part outer diameter was 385 µm, and the percentage of the cores of the optical communication path in the central part was 44%. An optical communication path arranged in the outer peripheral part was used as a second receiving optical communication path, and an optical communication path arranged in the central part was used as a second sending optical communication path. The second receiving optical communication path of the outer peripheral part was arranged at the same location as that of the first sending optical communication path, and the second sending optical communication path of the central part was arranged at the same location as that of the first receiving optical communication path.

The first optical fiber 11 and the second optical fiber 21 were opposed to each other with a space of 300 µm in between. The edge of the hollow multi-core plastic optical fiber was cut along the core, the multi-core plastic optical fiber of the hollow part was taken out, and was coupled to a laser diode (manufactured by NEC Corporation, model number NX5317EH) with a wavelength of 1.3 µm, as a light-emitting diode, and to a photodiode (manufactured by Hamamatsu Photonics Corporation, model number G9820) as a light-receiving element. While rotating the rotational part with a speed of 10 RPM, a NRZ (Non Return to Zero) signal with a data rate of 1.5 Gb/s was input, as a signal, into a drive circuit of the laser diode in a PRBS (pseudo-random number bit string) PN31 format. As a result of measuring the bit error rate (BER) from the output of the photodiode receiving circuit, BER was found to be $1 \times 10^{-12}$ or below in both directions.

EXAMPLE 3

A hollow multi-core plastic optical fiber (380 cores, core diameter of 27 µm, bare wire inner diameter of 630 µm, bare wire outer diameter of 1000 µm, length of 10 cm) was used as an outer peripheral part of a first optical fiber 11, and a multi-core plastic optical fiber 16 (37 cores, core diameter of 42 µm, bare wire outer diameter of 400 µm, coating outer diameter of 600 µm, length of 10 cm) was used as a central part. The outer peripheral part outer diameter of the first optical fiber 11 was 990 µm, the percentage of the cores of the optical communication path in the outer peripheral part was 49%, the central part outer diameter was 385 µm, and the percentage of the cores of the optical communication path in the central part was 44%. An optical communication path arranged in the outer peripheral part was used as a first sending optical communication path, and an optical communication path arranged in the central part was used as a first receiving optical communication path. The first sending optical communication path of the outer peripheral part and the first receiving optical communication path of the central part were both arranged randomly.

A hollow multi-core plastic optical fiber (380 cores, core diameter of 27 µm, bare wire inner diameter of 630 µm, bare wire outer diameter of 1000 µm, length of 10 cm) was used as an outer peripheral part of a second optical fiber 21, and a multi-core plastic optical fiber (37 cores, core diameter of 42 µm, bare wire outer diameter of 400 µm, coating outer diameter of 600 µm, length of 10 cm) was used as a central part. The outer peripheral part outer diameter of the second optical fiber 21 was 990 µm, the percentage of the cores of the optical communication path in the outer peripheral part was 49%, the central part outer diameter was 385 µm, and the percentage of the cores of the optical communication path in the central part was 44%. An optical communication path arranged in the outer peripheral part was used as a second receiving optical communication path, and an optical communication path arranged in the central part was used as a second sending optical communication path. The second receiving optical communication path of the outer peripheral part and the second sending optical communication path of the central part were both arranged randomly.

The first optical fiber 11 and the second optical fiber 21 were opposed to each other with a space of 300 µm in between. The edge of the hollow multi-core plastic optical fiber was cut along the core, the multi-core plastic optical fiber of the hollow part was taken out, and was coupled to a laser diode (manufactured by NEC Corporation, model number NX5317EH) with a wavelength of 1.3 µm, as a light-emitting diode, and to a photodiode (manufactured by Hamamatsu Photonics Corporation, model number G9820) as a light-receiving element. While rotating the rotational part with a speed of 10 RPM, a NRZ (Non Return to Zero) signal with a data rate of 1.5 Gb/s was input, as a signal, into a drive circuit of the laser diode in a PRBS (pseudo-random number bit string) PN31 format. As a result of measuring the bit error rate (BER) from the output of the photodiode receiving circuit, BER was found to be $1 \times 10^{-12}$ or below in both directions.

EXAMPLE 4

A hollow multi-core plastic optical fiber (380 cores, core diameter of 35 µm, bare wire inner diameter of 630 µm, bare wire outer diameter of 1000 µm, length of 10 cm) was used as an outer peripheral part of a first optical fiber 11, and a multi-core plastic optical fiber 16 (37 cores, core diameter of 54 µm, bare wire outer diameter of 400 µm, coating outer diameter of 600 µm, length of 10 cm) was used as a central part. The outer peripheral part outer diameter of the first optical fiber 11 was 996 µm, the percentage of the cores of the optical communication path in the outer peripheral part was 79%, the central part outer diameter was 396 µm, and the percentage of the cores of the optical communication path in the central part was 69%. An optical communication path arranged in the outer peripheral part was used as a first sending optical communication path, and an optical communication path arranged in the central part was used as a first receiving optical communication path. The first sending optical communication path of the outer peripheral part and the first receiving optical communication path of the central part were both arranged in layers in a concentric manner centered around a central axis of the first optical fiber, with a predetermined space in between.

A hollow multi-core plastic optical fiber (380 cores, core diameter of 35 µm, bare wire inner diameter of 630 µm, bare wire outer diameter of 1000 µm, length of 10 cm) was used as an outer peripheral part of a second optical fiber 21, and a multi-core plastic optical fiber (37 cores, core diameter of 54 µm, bare wire outer diameter of 400 µm, coating outer diameter of 600 µm, length of 10 cm) was used as a central part. The outer peripheral part outer diameter of the second optical fiber 21 was 996 µm, the percentage of the cores of the optical communication path in the outer peripheral part was 79%, the central part outer diameter was 396 μm, and the percentage of the cores of the optical communication path in the central part was 69%. An optical communication path arranged in the outer peripheral part was used as a second receiving optical communication path, and an optical communication path disposed in the central part was used as a second sending optical communication path. The second receiving optical communication path of the outer peripheral part was arranged at the same location as that of the first sending optical communication path, and the second sending optical communication path of the central part was arranged at the same location as that of the first receiving optical communication path.

The first optical fiber 11 and the second optical fiber 21 were opposed to each other with a space of 1100 μm in between. The edge of the hollow multi-core plastic optical fiber was cut along the core, the multi-core plastic optical fiber of the hollow part was taken out, and was coupled to a laser diode (manufactured by NEC Corporation, model number NX5317EH) with a wavelength of 1.3 μm, as a light-emitting diode, and to a photodiode (manufactured by Hamamatsu Photonics Corporation, model number G9820) as a light-receiving element. While rotating the rotational part with a speed of 10 RPM, a NRZ (Non Return to Zero) signal with a data rate of 1.5 Gb/s was input, as a signal, into a drive circuit of the laser diode in a PRBS (pseudo-random number bit string) PN31 format. As a result of measuring the bit error rate (BER) from the output of the photodiode receiving circuit, BER was found to be $1\times10^{-12}$ or below in both directions.

Next, an experiment was performed to measure the efficiency of light utilization. A surface light-emitting type laser diode with a wavelength of 850 nm, was used, as a light-emitting element, in a multi-core plastic optical fiber with a length of 50 cm and the same structure as that of the first optical fiber 11 used in Example 1, and an optical power was measured by using, an optical power meter (manufactured by Hakutronics Corporation, optical power meter, PHO-TOM205). The optical power was 0 dB. In that state, when the part near the center of the multi-core plastic optical fiber was cut and polished, and when the optical power was measured while having the fibers opposed to each other with a space of 300 μm therebetween, the optical power was −2.3 dB. Similarly, when the transmission loss generated between joints of the rotary optical joint produced in Example 1 was measured, the value was −2.3 dB.

Then, after the rotary optical link joint produced in Example 1 was rotated at a speed of 10 RPM for 240 hours, when the transmission loss generated between joints was measured, the value was −2.3 dB, and there was no change in transmission loss due to rotational use.

Industrial Applicability

The rotary optical link joint according to the present invention may be suitably used for a high-speed digital link between objects that rotate or bend with respect to each other, such as in monitor cameras, car tires and robots.

What is claimed is:

1. A rotary optical link joint comprising:
    a first optical fiber; and
    a second optical fiber,
    wherein the first optical fiber and the second optical fiber are held so that the first optical fiber and the second optical fiber are relatively rotatable around an axis line of each of the first and second optical fibers,
    wherein at least one of the first optical fiber and the second optical fiber comprises:
        a hollow multi-core plastic optical fiber having a hollow portion and an outer peripheral layer outside the hollow portion; and
        an optical fiber disposed in the hollow portion of the hollow multi-core plastic optical fiber, and
    wherein the outer peripheral layer of the hollow multi-core plastic optical fiber has a sea-island structure formed of a sea and a plurality of islands in cross-section
        1) each of the islands of the sea-island structure has a sheath resin and a core resin having a refractive index that is higher than that of the sheath resin, the core resin being entirely surrounded by the sheath resin;
        2) the sea of the sea-island structure is formed of a resin, the resin of the sea is at least one resin selected from the group consisting of a same resin as the sheath resin and a third resin; and
        3) each of the islands is entirely surrounded by the resin of the sea so that each of the islands is fixed by the resin of the sea of the sea-island structure.

2. The rotary optical link joint according to claim 1, wherein the first optical fiber and the second optical fiber both comprise:
    the hollow multi-core plastic optical fiber having the hollow portion and the outer peripheral layer outside the hollow portion; and
    the optical fiber disposed in the hollow portion of the hollow multi-core plastic optical fiber.

3. A rotary optical link joint structure comprising:
    the rotary optical link joint according to claim 2;
    optical signal transmitting means configured to cause an optical signal to be incident on a part or all of the cores in the hollow multi-core plastic optical fiber at an input/output end surface of the first optical fiber;
    optical signal transmitting means configured to cause an optical signal to be incident on a part or all of the cores in the optical fiber disposed in the hollow portion of the hollow multi-core plastic optical fiber;
    optical signal receiving means configured to receive an optical signal that is emitted from a part or all of the cores in the hollow multi-core plastic optical fiber at an input/output end surface of the second optical fiber; and
    optical signal receiving means configured to receive an optical signal that is emitted from a part or all of the cores in the optical fiber disposed in the hollow portion of the hollow multi-core plastic optical fiber.

4. A rotary optical link joint structure comprising:
    the rotary optical link joint according to claim 2;
    optical signal receiving means configured to receive an optical signal that is emitted from a part or all of the cores in the hollow multi-core plastic optical fiber at an input/output end surface of the first optical fiber;
    optical signal transmitting means configured to cause an optical signal to be incident on a part or all of the cores in the optical fiber disposed in the hollow portion of the hollow multi-core plastic optical fiber;
    optical signal transmitting means configured to cause an optical signal to be incident on a part or all of the cores in the hollow multi-core plastic optical fiber at an input/output end surface of the second optical fiber; and
    optical signal receiving means configured to receive an optical signal that is emitted from a part or all of the cores in the optical fiber disposed in the hollow portion of the hollow multi-core plastic optical fiber.

5. The rotary optical link joint according to claim 1, wherein the middle of the hollow multi-core plastic optical fiber has a hole.

6. The rotary optical link joint according to claim 1, wherein an edge of the hollow multi-core plastic optical fiber is torn.

7. The rotary optical link joint according to claim 1, wherein the optical fiber disposed in the hollow portion of the hollow multi-core plastic optical fiber is a multi-core optical fiber.

8. The rotary optical link joint according to claim 1, wherein a connection portion of the first optical fiber and the second optical fiber is covered with a tubular dustproof structure.

9. The rotary optical link joint according to claim 1, wherein at least one of the first optical fiber and the second optical fiber is covered with a tubular structure having a conductive structure.

10. The rotary optical link joint according to claim 1, wherein the first optical fiber includes a first sending optical communication path, which is connectable to a first optical fiber light-emitting element and a first receiving optical communication path, which is connectable to a first optical fiber light-receiving element in a state where light from the first sending optical communication path is blocked, the second optical fiber includes a second receiving optical communication path, which is connectable to a second optical fiber light-receiving element and a second sending optical communication path, which is connectable to a second optical fiber light-emitting element in a state where light from the second receiving optical communication path is blocked, and the first receiving optical communication path is arranged in a central portion of the first optical fiber, the first sending optical communication path is arranged in an outer peripheral portion of the first optical fiber, the second sending optical communication path is arranged in a central portion of the second optical fiber, the second receiving optical communication path is arranged in an outer peripheral portion of the second optical fiber, an outer diameter of the central portion of the first optical fiber is equivalent to an outer diameter of the central portion of the second optical fiber, and a central axis of the first optical fiber is coincident with a central axis of the second optical fiber.

11. The rotary optical link joint according to claim 1, wherein each of the islands is fixed by the resin of the sea of the sea-island structure so that position of each said core does not change during use of the multi-core plastic optical fiber.

* * * * *